United States Patent [19]

Greischar

[11] 4,063,045
[45] Dec. 13, 1977

[54] TELECOMMUNICATION LINE SWITCHING CIRCUIT

[75] Inventor: Richard H. Greischar, Chicago, Ill.

[73] Assignee: Extel Corporation, Northbrook, Ill.

[21] Appl. No.: 709,234

[22] Filed: July 27, 1976

[51] Int. Cl.² .................. H04M 3/02; H04L 25/02
[52] U.S. Cl. .......................... 179/84 R; 178/2 R; 179/18 FA
[58] Field of Search ............ 178/2 R, 3, 4.1 R; 179/18 HB, 18 H, 84 R, 84 A, 99, 2 A, 2 C, 81 R, 18 F, 18 FA

[56] References Cited

U.S. PATENT DOCUMENTS

| | | | |
|---|---|---|---|
| 3,766,325 | 10/1973 | Hatfield et al. | 179/84 A |
| 3,894,175 | 7/1975 | Zaffignani et al. | 178/2 R |
| 3,941,939 | 3/1976 | Holmes et al. | 179/84 R |
| 3,952,169 | 4/1976 | Vincent | 179/99 |
| 4,004,106 | 1/1977 | Yachabach et al. | 179/99 |

Primary Examiner—Thomas A. Robinson
Attorney, Agent, or Firm—Kinzer, Plyer, Dorn & McEachran

[57] ABSTRACT

An isolated line switching circuit for direct connection of a telephone, teleprinter, or like telecommunication instrument to a transmission line, comprising a solid-state optical cell including a light-actuated optical receiver that generates an electrical current when illuminated by an associated light-emitting device (LED), and a switching transistor having its emitter-collector discharge path connected in series with the transmission line; the optical receiver is connected to the base and emitter of the transistor to drive the transistor conductive when the LED is energized by an actuation signal initiated in response to a ring signal. A high-resistance emitter-to-base circuit for the transistor drains the collector leakage current ($I_{CBO}$) and maintains a high off resistance even at high temperatures.

5 Claims, 1 Drawing Figure

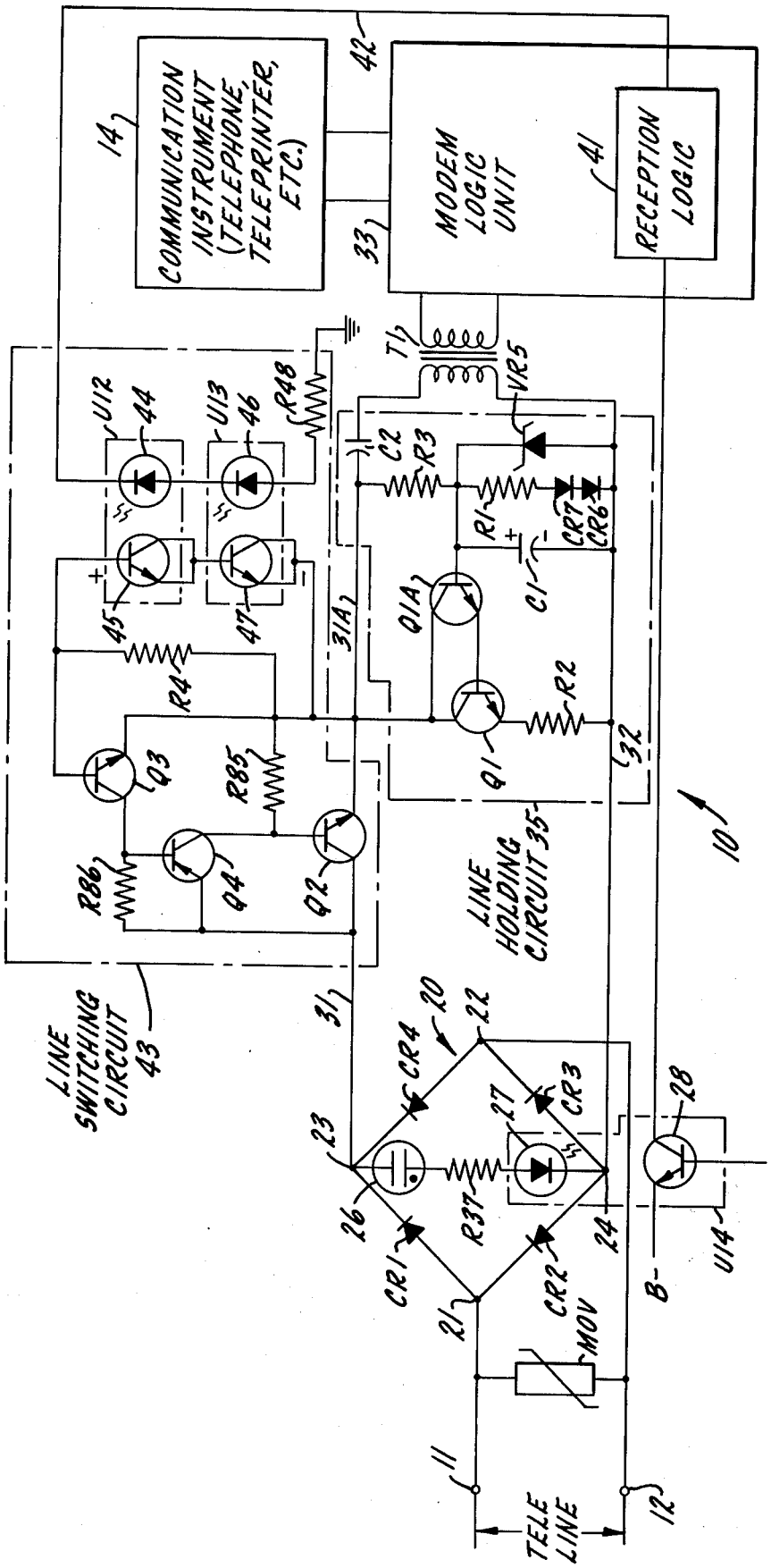

4,063,045

TELECOMMUNICATION LINE SWITCHING CIRCUIT

BACKGROUND OF THE INVENTION

The technical requirements for a switching circuit used to provide a direct line connection between a transmission line and a telephone, teleprinter or like communication instrument are quite stringent, particularly in public utility systems. Thus, a direct line connect circuit of this kind may be required to afford an "off" resistance of at least 20 megohms at 200 volts D.C., allowing for a leakage current of no more than 10 microamperes. This requirement must be met over a relatively broad range of temperatures and other varying operating conditions.

Electromechanical relays can be utilized for direct line connect switching circuits in communication systems. For many applications, however, relays are too slow, too large, and too costly. In addition, they are likely to present service problems if the operating environment for the communication instrument with which they are employed includes excessive quantities of dust or other pollutants in the air.

Mercury-wetted contact relays are also employed in direct line connect switching circuits. These devices afford substantial advantages in size and speed of operation as compared with electromechanical relays. The mercury relays, however, will not tolerate changes in orientation of the apparatus. Thus, a communication instrument constructed for horizontal orientation cannot be operated in a substantially vertical orientation if this kind of line connect switch is employed. Furthermore, mercury-wetted contact relays are sensitive to external magnetic fields, and hence may be subject to spurious operation if mounted in close proximity to a power transformer or other device in the communication station that produces an appreciable magnetic field.

Conventional solid state switching circuits, on the other hand, do not ordinarily meet the operational requirements of direct line connect communication system service. They often do not afford sufficient isolation from the transmission line. In addition, the off resistance requirements mentioned above are difficult to meet with this kind of switch.

SUMMARY OF THE INVENTION

It is a principal object of the invention, therefore, to provide a new and improved direct line connect switching circuit for a communication station, comprising a telephone, teleprinter, or the like, that effectively and inherently overcomes the difficulties and disadvantages of previously known switching devices as discussed above.

Another object of the invention is to provide a new and improved solid state line switching circuit, suitable for direct line connection use in connecting a telephone, teleprinter, or like communication instrument to a transmission line, that is fully isolated from the transmission line, and that can be readily constructed to afford an off resistance of at least 20 megohms at D.C. voltages as high as 200 volts.

Another object of the invention is to provide a new and improved fully isolated line switching circuit for direct line connection of a telephone, teleprinter, or like communication instrument to a transmission line that is compact in size, inexpensive in construction, and capable of long maintenance-free life, but which is not orientation sensitive nor particularly sensitive to external magnetic fields.

Thus, the invention is directed to an improved telecommunication station modem for a telephone, teleprinter, or like communication instrument, of the kind including a line holding circuit for coupling a transmission line to the instrument, a line switching circuit interposed between the instrument and the transmission line, and a reception logic circuit for generating a switch actuation signal in response to a ring signal received on the transmission line and maintaining that switch actuation signal until completion of a communicaton. The improvement of the invention comprises an isolated line switching circuit having high off resistance, including a light-emitting device connected to the reception logic circuit for energization by the switch actuation signal and a light-actuated optical receiver which generates an electrical signal when illuminated by the light-emitting device. A solid-state switching device having a main discharge path, including first and second main electrodes, connected in series between the communication instrument and the transmission line, and having a control electrode connected to the optical receiver so that the main discharge path of the switching device is actuated from a normal non-conductive state to an actuated conductive state in response to a signal from the optical receiver, is included in the circuit. A leakage current circuit is connected between the control electrode and one main electrode of the switching device to drain leakage current for the other main electrode.

BRIEF DESCRIPTION OF THE DRAWINGS

The single FIGURE is a schematic diagram of a line switching circuit constructed in accordance with a preferred embodiment of the present invention, together with other circuits of a direct line connect communication modem; some of the modem circuits are shown in block form.

DETAILED DESCRIPTION OF THE DISCLOSURE

The drawing illustrates a modem 10 employed to provide a direct line connection from a transmission line, represented by the line terminals 11 and 12, to a communication instrument 14. Instrument 14 may comprise a conventional telephone, teleprinter, or other similar apparatus. The transmission line 11,12 may constitute a branch line of a public utility communcation system.

The two transmission line terminals 11 and 12 are connected to two opposed terminals 21 and 22 of a rectifier bridge circuit 20. Bridge 20 includes four diodes CR1 through CR4, the remaining bridge terminals being identified by reference numerals 23 and 24. A gas discharge tube 26, a current limiting resistor R37, and a light-emitting diode (LED) 27 are connected in series with each other across ridge terminals 23 and 24. The LED 27 is a part of an optical cell U14 which includes a light-actuated optical receiver 28. The optical receiver 28 is of a kind which generates a current when illuminated by the LED 27. The operating characteristics of optical receiver 28 are otherwise similar to those of a NPN transistor and the device is illustrated in that form in the drawing.

Bridge terminal 23 is connected by a line 31, 31A to one terminal of the primary winding of a coupling transformer T1, a capacitor C2 being connected in series in this circuit. The other terminal of the primary winding of transformer T1 is connected to bridge terminal 24 by a conductor 32. The secondary winding of transformer T1 is connected to a modem logic unit 33 which is in turn coupled to communication instrument 14.

Modem 10 further comprises a line holding circuit 35 connected across lines 31A and 32 in parallel with the primary transformer T1, ahead of capacitor C2. The line holding circuit 35 includes two transistors Q1 and Q1A connected together in a Darlington amplifier configuration. Thus, the collectors of the two transistors are connected to each other and are connectd to line 31A, the emitter of transistor Q1A is connectd to the base of transistor Q1, and the emitter of transsstor Q1 is connected to line 32 through a resistor R2. The base of transistor Q1A is connected to a voltage divider comprising a resistor R3 that is connected to line 31A and a resistor R1 that is connected to line 32 in series with two diodes CR6 and CR7. A capacitor C1 is connected from the base of transistor Q1A to line 32, in parallel with a zener diode VR5.

The receiver device 28 in optical cell U14 has its emitter connected to a suitable DC supply B-. The collector is connected to a reception logic circuit 41 that is a part of the modem logic unit 33. Logic circuit 41, in turn, is connected by a conductor 42 to a line switching circuit 43 comprising a preferred embodiment of the present invention.

Line switching circuit 43 includes two solid-state optical cells U12 and U13. Cell U12 comprises a signal-actuated light-emitting device (LED) 44 and a light-actuated optical receiver 45 which generates an electrical current when illuminated by LED 44. Cell U13 is of corresponding construction and comprises an LED 46 and an optical receiver 47. The two LEDs 44 and 46 are connected in series with each other and with a resistor R48 in circuit from conductor 42 to system ground.

The two optical receivers 45 and 47 are also connected in series with each other, the emitter and collector of device 45 being connected to the base of device 47. The base of optical receiver 45 is also connected to the base of a solid state switching device, in this instance a transistor Q3. The emitter and collector of optical receiver 47 are connected together and are connected to the emitter of transistor Q3. The emitter of transistor Q3 is also connected to the conductor 31A. A leakage current circuit comprising a resistor R4 is connected from the base to the emitter of transistor Q3.

The collector of transistor Q3 is connected to the base of another switching transistor Q4. A leakage current circuit comprising a resistor 86 is connected between the base and the emitter of transistor Q4. The emitter of transistor Q4 is connected to conductor 31. A third switching transistor Q2 is incorporated in line switchng circuit 43 has its collector connected to conductor 31 and its emitter connected to conductor 31A, so that the main emitter-collector discharge path of transistor Q2 is connected in series between the transmission line and those circuits 33,35 that connect the transmission line to instrument 14. The base of transistor Q2 is connected to the collector of transistor Q4 and a leakage circuit comprising a resistor R85 is connected from the base of transistor Q2 back to its emitter.

In operation, starting at a time during which the telephone, teleprinter, or other communication instrument 14 is not in use, the two LEDs 44 and 46 of optical cells U12 and U13 are not energized, so that there is no current output from the optical receivers 45 and 47. Under these conditions, the switching transistors Q2, Q3 and Q4 are all in a normal non-conductive condition, the "off" condition for line switching circuit 43. There is a virtual open circuit between the emitter and collector of transistor Q2 and no data signal is supplied to transformer T1 for communication to instrument 14. In these circumstances, even though there may be a data signal across the transmission line terminals 11 and 12, no such signal is supplied to instrument 14.

Active operation of instrument 14 is initiated by a ring signal received at the transmission line terminals 11 and 12, which may be either the ring or tip terminals of a conventional telephone transmission line. The ring signal is a low frequency, high-voltage signal, usually in the range of 16 to 60 hertz at a voltage of 70 to 120 volts rms.

When such a ring signal appears at terminals 11 and 12, gas discharge tube 26 breaks down and becomes conductive during the peak portions of the received AC signal. Each time tube 26 becomes conductive LED 27 is energized through the circuit comprising the current limiting resistor R37. Thus, LED 27 produces a series of light flashes, at twice the frequency of the incoming signal, and these light flashes actuate the optical receiver 28 that is combined with LED 27 in the optical cell U14.

Optical receiver 28 supplies the doubled-frequency ring signal to reception logic circuit 41, in which the signal is checked for frequency and duration to make certain that it is in fact a true ring signal. When the presence of a ring signal has been verified, logic circuit 41 generates a switch actuation signal which is supplied to LEDs 44 and 46 in the line switching circuit 43 through conductor 42. The reception logic circuit 41 maintains this switch actuation signal to the LEDs 44 and 46 until completion of a communication, as determined by other circuits in modem logic circuit 33.

With the two LEDs 44 and 46 energized, the light that they emit actuates optical receivers 45 and 47 from a normal quiescent condition to an actuated condition in which each of the optical receivers generates an electrical signal. The signal voltage developed by these devices is quite small, being only approximately 0.5 volts per cell. It is for this reason that the two optical cells U12 and U13 are used in series with each other. A single optical receiver having a sufficient output to drive transistor Q3 conductive could be substituted for the two illustrated devices U12 and U13.

The combined output from the optical receivers 45 and 47, as applied to the base-emitter circuit of transistor Q3, drives that transistor from its non-conductive to its conductive operating state. The resulting output from transistor Q3 in turn drives transistor Q4 conductive; with transistor Q4 conductive, transistor Q2 is rendered conductive, thereby completing the actuation of line switching circuit 43 from its "off" condition to its "on" condition. The three stages of amplication afforded by the transistors Q3, Q4 and Q2 have gains of approximately 10, 20, and 20. Consequently, although the current in the base-emitter circuit of transistor Q3, comprising the optical receiver cells 45 and 47, is only approximately 100 microamperes, transistor Q2 is rendered fully conductive and presents little or no impedance in the circuit comprising conductors 31 and 31A. Accordingly, any continuing data signals appearing at the transmission line terminals 11 and 12 are effectively applied to the primary of transformer T1 without substantial attenuation and can be supplied, with any required demodulation in logic unit 33, to the telephone, teleprinter, or other communication instrument 14. This operating condition is maintained until an on-hook or other interruption signal is received and supplied to reception logic circuit 41 to terminate the switch actuation signal being supplied to LEDs 44 and 46 on line 42.

By utilizing high voltage transistors for the switching transistors Q2, Q3 and Q4, particularly transistors with low collector leakage current ($I_{CBO}$), the current through transistor Q2 with circuit 43 in its off condition can be readily held below ten microamperes, even for relatively high operating temperatures. This is made possible by the leakage current circuit comprising resistors R4, R86, and R85, which serve to drain off the collector leakage currents for transistors Q3, Q4 and Q2 respectively. If these leakage current circuits were not present, the collector leakage currents ($I_{CBO}$) would be amplified in the line switching circuit and the current for the "off" condition of the switching circuit 43 would not be maintained below the desired maximum values. In actual operation, the illustrated construction for circuit 43 affords an off resistance in excess of 20 megohms at 200 volts D.C., as compared with a resistance of less than ten ohms when circuit 43 is in its on condition.

The illustrated construction, with three stages of amplification represented by the three switching transistors Q2, Q3 and Q4, can be modified substantially. The number of stages required, using switching transistors of given type, is determined by the maximum current to be passed through the switching circuit to line 31A. For high current applications, additional stages may be added. For low current applications, the number of stages can be reduced. Thus, if switching circuit 43 is required only to pass a minimal current to transformer T1, transistors Q3 and Q4 and resistors R4 and R86 may be eliminated entirely and the base of optical receiver 45 may be connected directly to the base of the transistor Q2 to afford a single-stage line switching circuit.

The line holding circuit 35 complements switching circuit 43 in that it eliminates the usual large holding coil and allows he use of a small couping transformer T1, minimizing the overall size and cost for modem 10. In operation of line holding circuit 35, the Darlington amplifier Q1, Q1A functions as an impedance converter to change the capacitive impedance of capacitor C1 to an inductive impedance for the holding circuit. The diodes CR6 and CR7 compensate for the base-emitter drops in the two transistors of the amplifier.

To afford a more complete working example of the complete modem 10 incorporating the present invention, specific circuit parameters are set forth below. It should be understood that this specific circuit information is representative only of a preferred construction for the invention and is included merely by way of example, not as a limitation on the invention.

| Device | Type or Size |
| --- | --- |
| U12, U13, U14 | IL-1 |
| Q1, Q1A | D4OC4 |
| Q2, Q3 | 2N6177 |
| Q4 | 2N5416 |
| CR1 - CR4 | 1N4004 |
| 26 | SR-90 |
| CR6, CR7 | 1N914 |
| VR5 | 1N5230 |
| R1 | 22 kilohms |
| R2 | 47 ohms |
| R4 | 300 kilohms |
| R37 | 8.2 kilohms |

-continued

| Device | Type or Size |
| --- | --- |
| R48 | 680 ohms |
| R85, R86, R3 | 47 kilohms |
| C1 | .47 microfarads |
| C2 | 2 microfarads |

The B— supply for the foregoing circuit is —12 volts. Th circuit affords an off resistance exceeding 200 megohms and an on resistance of less than 10 ohms.

I claim:

1. In a telecommunication station modem for a telephone, teleprinter, or like communication instrument, of the kind including a line holdng circuit for coupling a transmission line to the instrument, a line switching circuit interposed between the instrument and the transmission line, and a reception logic circuit for generating a switch actuation signal in response to a ring signal received on the transmission line and maintaining that switch actuation signal until completion of a communication, the improvement comprising an isolated line switchin circuit having high off resistance and including:

a light-emitting device connected to the reception logic circuit for energization by the switch actuation signal;

a light-actuated optical receiver which generates an electrical signal when illuminated by the light-emitting device;

a solid-state switching device having a main discharge path, including first and second main electrodes, connected in series between the communication instrument and the transmission line, and having a control electrode and one main electrode connected to the optical receiver so that the main discharge path of the switching device is actuated from a normal non-conductive state to an actuated conductive state in response to a signal from the optical receiver, with no additional external energization;

and a leakage current circuit connected between the control electrode and one main electrode of the switching device to drain leakage current for the other main electrode.

2. A telecommunication modem, according to claim 1, in which the switchng device is a switching transistor having its emitter-collector discharge path connected in series with the transmission line and having its base and emitter effectively connected to the optical receiver, the leakage current circuit comprising a high resistance circuit connected between the base and emitter of the transistor.

3. A telecommunication modem, according to claim 2, and further comprising at least one additional switching transistor, each additional switching transistor having its emitter connected to one side of the transmission line and its collector connected to the base of the preceding transistor, the last transistor in the sequence having its base and emitter connected to the optical receiver, each transistor having a high resistance leakage current circuit connected between its base and its emitter, with successive transistors in the sequence being of opposite conductivity types.

4. A telecommunication modem, according to claim 1, in which the light-emitting device and the optical receiver are both part of a single optical cell.

5. A telecommunicatin modem, according to claim 1, furthr comprising a ring signal sensor including:
- a rectifier bridge having transmission line output connections at a first pair of opposed terminals of the bridge and having a transmission line continuation connections at a second pair of opposed bridge terminals;
- a discharge device having a predetermined conductivity threshold and an additional light-emitting device connected in series across the second pair of bridge terminals;
- and an additional optical receiver for generating an electrical signal when illuminated by the additional light-emitting device.

* * * * *